US012625775B2

(12) United States Patent
Liu

(10) Patent No.: US 12,625,775 B2
(45) Date of Patent: May 12, 2026

(54) BACKUP MANAGEMENT METHOD AND SYSTEM, DEVICE, AND MEDIUM

(71) Applicant: HUAWEI TECHNOLOGIES CO., LTD., Shenzhen (CN)

(72) Inventor: Feng Liu, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 43 days.

(21) Appl. No.: 18/006,989

(22) PCT Filed: Jul. 28, 2021

(86) PCT No.: PCT/CN2021/109011
§ 371 (c)(1),
(2) Date: Jan. 26, 2023

(87) PCT Pub. No.: WO2022/022587
PCT Pub. Date: Feb. 3, 2022

(65) Prior Publication Data
US 2023/0267050 A1 Aug. 24, 2023

(30) Foreign Application Priority Data
Jul. 28, 2020 (CN) ........................ 202010740387.X

(51) Int. Cl.
*G06F 11/14* (2006.01)
*G06F 11/1446* (2026.01)

(52) U.S. Cl.
CPC ...... *G06F 11/1456* (2013.01); *G06F 11/1464* (2013.01); *G06F 11/1469* (2013.01)

(58) Field of Classification Search
CPC ............. G06F 11/1456; G06F 11/1464; G06F 11/1469
See application file for complete search history.

(56) References Cited

U.S. PATENT DOCUMENTS 8,180,734 B1     5/2012 Thilmony et al.
8,924,355 B1 *  12/2014 Kundzich ........... G06F 11/1458
                                                          707/647

(Continued)

FOREIGN PATENT DOCUMENTS

CN          101394424 A       3/2009
CN          101945378 A       1/2011
CN          111984461 A  *  11/2020  .......... G06F 11/1448

OTHER PUBLICATIONS

An article attached to this application titled "Dig for dummies" by Willem L. Middelkoop published May 24, 2019 that describes the basic functionality of a domain name server. (Year: 2019).*

(Continued)

*Primary Examiner* — Janice M. Girouard
(74) *Attorney, Agent, or Firm* — Fish & Richardson P.C.

(57) ABSTRACT

Backup management methods, systems, devices, and media are disclosed. A network device is connected to a terminal device. The network device determines whether a backup task associated with the terminal device exists, where the backup task is used to store to-be-backed-up target data in the terminal device in a destination storage device, and the destination storage device is connected to the network device. If the network device determines that the backup task exists, the network device indicates the terminal device to start the backup task, to store the target data in the destination storage device.

18 Claims, 6 Drawing Sheets

(56) References Cited

U.S. PATENT DOCUMENTS

| | | | | |
|---|---|---|---|---|
| 10,102,083 | B1* | 10/2018 | Dobrean ............... | G06F 16/113 |
| 10,445,183 | B1 | 10/2019 | Dobrean et al. | |
| 2010/0121820 | A1 | 5/2010 | Thapa | |
| 2010/0169590 | A1 | 7/2010 | Gordon-Carroll et al. | |
| 2011/0125717 | A1* | 5/2011 | Manson .............. | G06F 11/1458 |
| | | | | 711/E12.001 |
| 2015/0244798 | A1 | 8/2015 | Bolotin et al. | |
| 2018/0143880 | A1* | 5/2018 | Dornemann ........ | G06F 11/2048 |
| 2019/0087278 | A1* | 3/2019 | Almog ................ | G06F 21/6227 |
| 2019/0332491 | A1 | 10/2019 | Tan et al. | |
| 2019/0335551 | A1* | 10/2019 | Williams ............... | H05B 45/24 |
| 2021/0117278 | A1* | 4/2021 | Yadav ................. | G06F 11/1451 |
| 2023/0328138 | A1* | 10/2023 | Bai ..................... | H04L 67/1095 |
| | | | | 709/201 |

OTHER PUBLICATIONS

Extended European Search Report in European Appln No. 21851092. 3, dated Apr. 10, 2024, 24 pages.
Partial Supplementary European Search Report in European Appln No. 21851092.3, dated Dec. 5, 2023, 20 pages.
International Search Report and Written Opinion in International Appln. No. PCT/CN2021/109011, mailed on Aug. 31, 2021, 15 pages (with English translation).

* cited by examiner

300

BACKUP MANAGEMENT METHOD AND SYSTEM, DEVICE, AND MEDIUM

CROSS REFERENCE TO RELATED APPLICATIONS

This application is a national stage of International Application No. PCT/CN2021/109011, filed on Jul. 28, 2021, which claims priority to Chinese Patent application No. 202010740387.X, filed on Jul. 28, 2020. Both of the aforementioned applications are incorporated herein by reference in their entireties.

TECHNICAL FIELD

Embodiments of this disclosure relate to the storage field, and more specifically, to a backup management method and system, a device, and a medium.

BACKGROUND

With development of a terminal device such as a mobile phone, a tablet computer, a television, and an in-vehicle infotainment system, dependence of a user on the terminal device increasingly increases, and a size and importance of data stored by the user in the terminal device (for example, an image, a video, audio, or application data) increasingly increase. In this case, when storage space of the terminal device is insufficient or the terminal device is faulty, lost, replaced, or the like, how to permanently store user data in the terminal device becomes a challenge.

Conventionally, the user data in the terminal device may be backed up in another storage device, to expand storage space of the terminal device, or the user data is restored by using another storage device when the terminal device is faulty, lost, replaced, or the like. However, such a backup operation is manually performed by the user to different degrees. However, the user may sometimes forget to do a backup or cannot do a backup in a timely manner. In addition, performing such a backup operation may be difficult for some users, reducing user experience.

SUMMARY

Embodiments of this disclosure provide a backup management solution, to implement automatic backup of data, and improve backup efficiency.

According to a first aspect of this disclosure, a backup management method is provided. The method includes: A network device is connected to a terminal device; the network device determines whether a backup task associated with the terminal device exists, where the backup task is used to store to-be-backed-up target data in the terminal device in a destination storage device, and the destination storage device is connected to the network device; and if the network device determines that the backup task exists, the network device indicates the terminal device to start the backup task, to store the target data in the destination storage device. In this manner, the network device can automatically detect whether the backup task exists, and automatic backup of data in the terminal device is implemented when the backup task exists, without a need to perform manual intervention, to improve backup efficiency and user experience.

In some embodiments, after the network device indicates the terminal device to start the backup task, the method further includes: The network device receives destination address information and the target data that are sent by the terminal device; the network device finds the destination storage device based on the destination address information; and the network device sends the target data to the found destination storage device. In this manner, the network device can search for the destination storage device based on the destination address information from the terminal device, and the terminal device does not need to have a capability of searching for the destination storage device. Therefore, stability of a backup system can be improved.

In some embodiments, the destination address information includes an identifier of the destination storage device; or the destination address information includes an identifier of the destination storage device and an identifier of a destination directory in the destination storage device. In this manner, the destination storage device and the destination directory can be easily determined.

In some embodiments, the indicating the terminal device to start the backup task includes: The network device sends an application start request to a cloud server of the terminal device, to indicate the cloud server to start a backup application in the terminal device; or the network device directly sends an application start request to the terminal device, to indicate the terminal device to start a backup application. In this manner, the network device can indicate the cloud server to start the backup application or the network device automatically starts the backup application in the terminal device, without a need to perform manual intervention, to start the backup task. Therefore, backup efficiency and user experience are improved.

In some embodiments, that the network device finds the destination storage device based on the destination address information includes: The network device determines an address of the destination storage device based on the destination address information and device information of at least one candidate storage device connected to the network device. In this manner, the network device can determine the address of the destination storage device based on the destination address information from the terminal device, and the terminal device does not need to learn of the address of the destination storage device. In this case, when the address of the destination storage device changes, the network device may address the destination storage device without a need to update the destination address information in the terminal device. Therefore, stability of a backup system can be improved.

In some embodiments, the device information includes an identifier of the at least one candidate storage device and an address of the at least one candidate storage device; or the device information includes an identifier of the at least one candidate storage device, an identifier of a candidate directory in the at least one candidate storage device, and an address of the at least one candidate storage device. In this manner, an address of a candidate storage device can be easily determined based on an identifier of the candidate storage device, so that even if the address of the candidate storage device changes, a changed address of the candidate storage device can be determined based on the identifier of the candidate storage device. In addition, a candidate directory that can be provided by the candidate storage device can be easily determined based on the identifier of the candidate storage device. Therefore, efficiency and stability of a backup system can be improved.

In some embodiments, the determining an address of the destination storage device includes: The network device obtains the identifier of the destination storage device from the destination address information; the network device determines, from the device information, an identifier of a candidate storage device that matches the identifier of the destination storage device; and the network device determines that an address of a candidate storage device associated with the identifier of the candidate storage device is the address of the destination storage device. In this manner, the network device can determine the address of the destination storage device based on the destination address information from the terminal device, and the terminal device does not need to learn of the address of the destination storage device. In this case, when the address of the destination storage device changes, the network device may address the destination storage device without a need to update the destination address information in the terminal device. Therefore, stability of a backup system can be improved.

In some embodiments, before the network device determines whether the backup task associated with the terminal device exists, the method further includes: The network device obtains the device information of the at least one candidate storage device connected to the network device; the network device sends address information of the at least one candidate storage device in the obtained device information to the terminal device, where the address information includes the identifier of the at least one candidate storage device, or the address information includes the identifier of the at least one candidate storage device and an identifier of a directory in the at least one candidate storage device; the network device obtains an identifier of the terminal device and the destination address information from the terminal device, where the destination address information is at least one piece of address information in the address information of the at least one candidate storage device; and the network device creates the backup task based on the identifier of the terminal device and the destination address information. In this manner, the backup task can be conveniently created in an initial stage, so that automatic backup of data in the terminal device can be implemented in a subsequent stage, to improve backup efficiency and user experience.

In some embodiments, before the network device sends the target data to the found destination storage device, the method further includes: The network device receives login information sent by the terminal; the network device sends the login information to the destination storage device for verification; and if verification succeeds, the network device performs the step of sending the target data to the found destination storage device. In this manner, security of a backup system can be improved.

According to a second aspect of this disclosure, a backup management method is provided. The method includes: A terminal device is connected to a network device; the terminal device starts a backup task in response to an indication of the network device, where the backup task is used to store to-be-backed-up target data in the terminal device in a destination storage device, and the destination storage device is connected to the network device; and the terminal device sends the target data to the network device, to store the target data in the destination storage device. In this manner, automatic backup of data in the terminal device can be implemented without a need to perform manual intervention, to improve backup efficiency and user experience.

In some embodiments, the method further includes: The terminal device sends destination address information to the network device, so that the network device finds the destination storage device based on the destination address information, where the destination address information includes an identifier of the destination storage device; or the destination address information includes an identifier of the destination storage device and an identifier of a destination directory in the destination storage device. In this manner, the network device can search for the destination storage device based on the destination address information from the terminal device, and the terminal device does not need to have a capability of searching for the destination storage device. Therefore, stability of a backup system can be improved.

In some embodiments, that the terminal sends the target data to the network device includes: The terminal device obtains a time of a previous backup operation; and the terminal device uses, as the target data, data updated after the time in the terminal device, and sends the data to the network device. In this manner, data can be backed up in an incremental backup manner, to significantly reduce costs of data transmission and a backup operation, and greatly improve performance of a storage system.

In some embodiments, before the terminal device starts the backup task, the method further includes: The terminal device requests, from the network device, address information of at least one candidate storage device connected to the network device, where the address information includes an identifier of the at least one candidate storage device, or address information includes an identifier of the at least one candidate storage device and an identifier of a directory in the at least one candidate storage device; the terminal device selects one piece of address information from the address information of the at least one candidate storage device as the destination address information in response to an operation of a user; and the terminal device sends an identifier of the terminal device and the destination address information to the network device, so that the network device creates the backup task.

In some embodiments, before the terminal device sends the target data to the network device, the method further includes: The terminal device sends login information to the destination storage device by using the network device, so that the destination storage device verifies the terminal device; and if verification succeeds, the terminal device performs the step of sending the target data to the network device. In this manner, security of a backup system can be improved.

According to a third aspect of this disclosure, an electronic device is provided. The electronic device includes at least one processor and at least one memory. The at least one memory is coupled to the at least one processor, and stores instructions to be executed by the at least one processor. When the instructions are executed by the at least one processor, the electronic device is enabled to implement the method in the first aspect or the second aspect.

According to a fourth aspect of this disclosure, a computer-readable storage medium is provided. The computer-readable storage medium stores a computer program, and when the computer program runs on an electronic device, the electronic device is enabled to perform the method in the first aspect or the second aspect.

According to a fifth aspect of this disclosure, a computer program product is provided. When the computer program product runs on a computer, the computer is enabled to perform the method in the first aspect or the second aspect.

According to a sixth aspect of this disclosure, a backup management system is provided. The backup management system includes a terminal device, a network device, and at least one storage device. The terminal device is connected to the network device; the at least one storage device is connected to the network device; after the terminal device is connected to the network device, the network device determines whether a backup task associated with the terminal device exists, where the backup task is used to store to-be-backed-up target data in the terminal device in a destination storage device, and the destination storage device is one of the at least one storage device; if it is determined that the backup task exists, the network device indicates the terminal device to start the backup task; the terminal device sends the target data to the network device in response to an indication of the network device; the network device sends the target data to the destination storage device; and the destination storage device stores the target data. In this manner, the network device can automatically detect whether the backup task exists, and automatic backup of data in the terminal device is implemented when the backup task exists, without a need to perform manual intervention, to improve backup efficiency and user experience.

In some embodiments, that the terminal device sends the target data to the network device includes: The terminal device sends destination address information and the target data to the network device; that the network device sends the target data to the destination storage device includes: The network device finds the destination storage device based on the destination address information, and the network device sends the target data to the found destination storage device. The destination address information includes an identifier of the destination storage device; or the destination address information includes an identifier of the destination storage device and an identifier of a destination directory in the destination storage device. In this manner, the network device can search for the destination storage device based on the destination address information from the terminal device, and the terminal device does not need to have a capability of searching for the destination storage device. Therefore, stability of a backup system can be improved.

In some embodiments, that the network device indicates the terminal device to start the backup task includes: The network device directly indicates the terminal device to start the backup task, or the network device indicates, by using a cloud server, the terminal device to start the backup task. In this manner, the network device can indicate the cloud server to start a backup application or the network device automatically starts a backup application in the terminal device, without a need to perform manual intervention, to start the backup task, Therefore, backup efficiency and user experience are improved.

In some embodiments, that the network device finds the destination storage device based on the destination address information includes: The network device determines an address of the destination storage device based on the destination address information and device information of at least one candidate storage device connected to the network device, where the device information includes an identifier of the at least one candidate storage device and an address of the at least one candidate storage device; or the device information includes an identifier of the at least one candidate storage device, an identifier of a candidate directory in the at least one candidate storage device, and an address of the at least one candidate storage device. In this manner, an address of a candidate storage device can be easily determined based on an identifier of the candidate storage device, so that even if the address of the candidate storage device changes, a changed address of the candidate storage device can be determined based on the identifier of the candidate storage device. In addition, a candidate directory that can be provided by the candidate storage device can be easily determined based on the identifier of the candidate storage device. Therefore, efficiency and stability of a backup system can be improved.

In some embodiments, the network device creates the backup task before the network device determines whether the backup task associated with the terminal device exists. That the network device creates a backup task includes: The network device obtains the device information of the at least one candidate storage device; the network device sends address information of the at least one candidate storage device in the obtained device information to the terminal device, where the address information includes an identifier of the at least one candidate storage device, or the address information includes an identifier of the at least one candidate storage device and an identifier of a directory in the at least one candidate storage device; in response to an operation of a user, the terminal device selects one piece of address information from the address information of the at least one candidate storage device as the destination address information, and sends an identifier of the terminal device and the destination address information to the network device; and the network device creates the backup task based on the identifier of the terminal device and the destination address information. In this manner, the backup task can be conveniently created in an initial stage, so that automatic backup of data in the terminal device can be implemented in a subsequent stage, to improve backup efficiency and user experience.

In some embodiments, that the terminal device sends the target data to the network device in response to an indication of the network device includes: The terminal device sends login information and the destination address information to the network device in response to the indication of the network device, where the login information is used to log in to the destination storage device; the network device finds the destination storage device based on the destination address information, and the network device sends the login information to the destination storage device, so that the destination storage device verifies the login information; after verification succeeds, the network device returns, to the terminal device, a response indicating that verification succeeds; and the terminal device sends the target data to the network device based on the response indicating that verification succeeds. In this manner, security of a backup system can be improved.

In some embodiments, after the at least one storage device is connected to the network device, the at least one storage device sends an identifier of the at least one storage device and an address of the at least one storage device to the network device; and if the address of the at least one storage device is updated, the at least one storage device sends an updated address to the network device, so that the network device maintains a correspondence between an identifier of at least one storage device and an address of the at least one storage device. In this case, when the address of the destination storage device changes, the network device may obtain an updated address, to address the destination storage device. Therefore, stability of a backup system can be improved.

In some embodiments, the terminal device, the network device, and the at least one storage device are located in a same local area network. In this manner, when the terminal device, the network device, and the storage device are located in a same local area network, automatic backup of data in the terminal device can be implemented.

In some embodiments, the local area network is a Wi-Fi network.

In some embodiments, the network device is a router.

DESCRIPTION OF EMBODIMENTS

Figure 1:
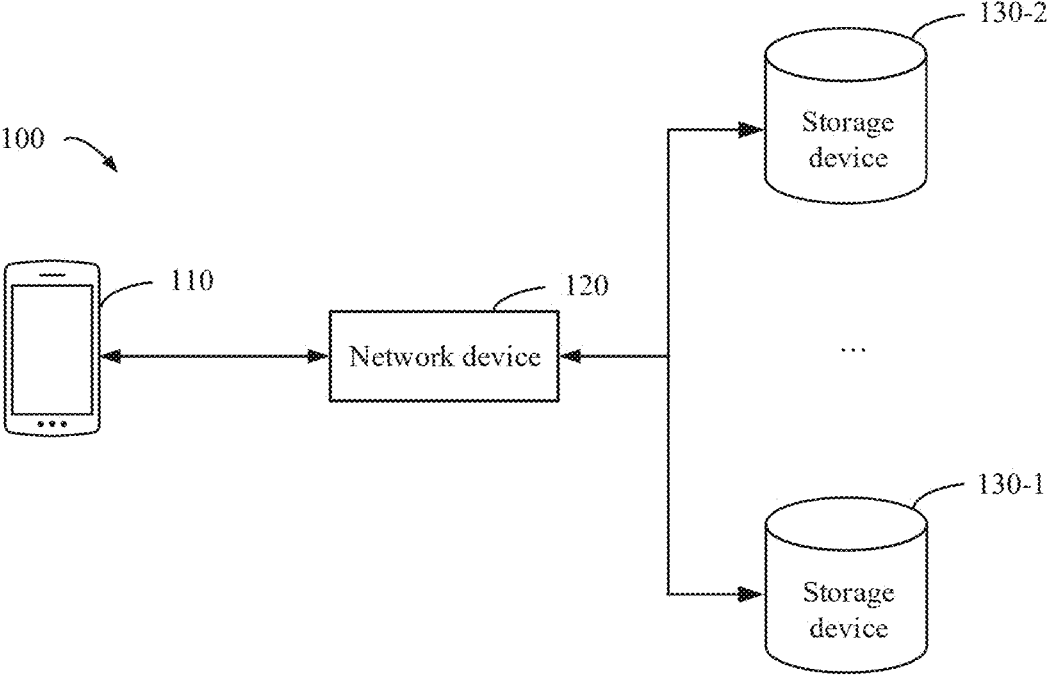
FIG. 1 is a schematic diagram of an example environment in which an embodiment of this disclosure can be implemented.

As used in this specification, a singular form "a", "one", and "the" are also intended to include plural forms unless otherwise specified in the context clearly. A term "including" and variants thereof shall be construed as open terms, and mean "including but not limited to". The term "based on" should be construed as "at least a part based on". The terms "one embodiment" and "an embodiment" should be construed as "at least one embodiment". The term "another embodiment" should be understood as "at least one another embodiment". The terms such as "first" and "second" may refer to different objects or a same object.

As described above, with development of a terminal device, there is an increasing requirement for permanently storing user data in the terminal device. Conventionally, the user data in the terminal device may be backed up in another storage device at a remote end. Therefore, a backup application may be installed in the terminal device, to implement automatic backup of the user data. The automatic backup provides good user experience. For example, after the terminal device accesses a predetermined network (for example, a Wi-Fi network in a home), a backup of the user data in the terminal device may be automatically triggered without a need to perform manual intervention by a user, so that the automatic backup can be performed in the background.

The backup application usually needs to run in the background for a long period of time. However, the terminal device usually allows only a system service to run in the background for a long period of time, but does not allow a common application such as the backup application to run in the background for a long period of time. Even if the terminal device may be set to allow the backup application to run in the background for a long period of time, running of the backup application may be forcibly stopped by a power saving mode, a third-party management application, or the like. The automatic backup cannot be implemented once running of the backup application is stopped. The user needs to manually start the backup application to start a backup operation.

In addition, the backup application needs to continuously perform periodic detection. For example, the backup application needs to continuously and periodically detect whether the terminal device accesses the predetermined network, and after determining that the terminal device accesses the predetermined network, continuously detects whether a storage device exists. Long-time background running and periodic detection of the backup application exert negative impact on performance, power, and the like of the terminal device.

Further, the backup application detects existence of the storage device by using a prestored address (for example, an IP address) of the storage device. However, the address of the storage device may change. For example, when the storage device is restarted or the address of the storage device is reallocated, the address of the storage device may change. In this case, existence of the storage device may not be detected by using the prestored address of the storage device. Consequently, the automatic backup cannot be performed.

To resolve at least some of the problem and another potential problem, an embodiment of this disclosure provides a backup management solution. In conclusion, in various embodiments described herein, if a network device determines that a terminal device is connected to the network device, the network device determines whether a backup task associated with the terminal device exists. The backup task is used to store to-be-backed-up target data in the terminal device to a destination storage device connected to the network device. If it is determined that the backup task exists, the network device indicates the terminal device to start the backup task. The terminal device starts the backup task in response to an indication of the network device. When the backup task is started, the terminal device sends destination address information (for example, an identifier of the destination storage device) and target data to the network device. The network device finds the destination storage device based on the destination address information, and sends the target data to the destination storage device. Therefore, the destination storage device stores the target data.

According to the solution in this embodiment of this disclosure, the backup task associated with the terminal device may be created in the network device, so that when detecting that the terminal device is connected, the network device may enable the terminal device to automatically start the backup task, instead of requiring a user to manually start the backup task on the terminal device (for example, manually open a backup application). In this manner, the backup application in the terminal device does not need to run in the background for a long period of time, and a problem that the automatic backup cannot be implemented when running of the backup application is forcibly stopped is avoided. In addition, the backup application does not need to continuously perform periodic detection, so that resources can be saved, to improve efficiency of the terminal device, and reduce power consumption.

Further, because the network device searches for the storage device, the terminal device does not need to have a capability of searching for the storage device. For example, because the network device manages the address of the storage device, the terminal device only needs to provide the identifier of the storage device for the network device, so that the network device determines the address of the storage device based on the identifier of the storage device, and the terminal device does not need to provide or learn of the address of the storage device. In this case, even if the address of the storage device changes, the network device can still correctly and accurately address the storage device, and a case in which the terminal device cannot address the storage device does not exist.

Various example embodiments of this disclosure are described below with reference to the accompanying drawings.

FIG. 1 is a schematic diagram of an example environment 100 in which an embodiment of this disclosure can be implemented. As shown in the figure, the example environment 100 includes a terminal device 110, a network device 120, and a storage device (for example, a storage device 130-1 and a storage device 130-2, which are collectively referred to as a "storage device 130" below).

The terminal device 110 may store to-be-backed-up data (which may also be referred to as "target data" herein). Although the terminal device 110 is shown as a mobile phone, it should be understood that this is merely an example and is not intended to limit the scope of this disclosure. The terminal device 110 may include a device of any proper type, for example, a mobile phone, a set-top box, a projector, an entertainment unit, a navigation device, a communications device, a tablet computer, a personal computer, a portable computer, a desktop computer, a personal digital assistant (PDA), a monitor, a radio, a satellite radio, a music player, a digital music player, a portable music player, a digital video player, a video player, a digital video disc (DVD) player, or a portable digital video player.

The terminal device 110 may be connected to the network device 120. The network device 120 may be any proper device having a network management capability, including but not limited to a router, a gateway, a hub, a repeater, or a switch. The terminal device 110 may be connected to the network device 120 through a network in any proper form, including but not limited to a wide area network (for example, the Internet), a local area network, a private network, a public network, a packet-based network, a wired network, or a wireless network.

The storage device 130 may be any proper device having a storage capability, including but not limited to an electrical storage device, a magnetic storage device, an optical storage device, an electromagnetic storage device, a semiconductor storage device, a distributed storage device, a cloud storage device, or any proper combination thereof. For example, a desktop computer, a notebook computer, a flat-panel display, a television, or the like in a home may serve as the storage device 130. In another example, a remote storage server, a data center, a cloud storage, or the like may also serve as the storage device 130. The storage device 130 may be connected to the network device 120. For example, the storage device 130 may be located in a local area network managed by the network device 120, to be connected to the network device 120 through the local area network. However, the storage device 130 may be connected to the network device 120 through a network in any proper form, including but not limited to the wide area network (for example, the Internet), the private network, the public network, the packet-based network, the wired network, or the wireless network. It should be understood that although two storage devices 130-1 and 130-2 are shown in FIG. 1, this is merely an example but does not impose a limitation. In the environment 100 shown in FIG. 1, there may be only one storage device, or there may be three or more storage devices.

The terminal device 110 may store to-be-backed-up target data in the storage device 130. In some embodiments, the terminal device 110 may be connected to the storage device 130 by using the network device 120, to store the to-be-backed-up target data in the storage device 130 by using the network device 120. The terminal device 110 may be connected to the storage device 130 through a network in any proper form, including but not limited to a wide area network (for example, the Internet), a local area network, a private network, a public network, a packet-based network, a wired network, or a wireless network. In some embodiments, the terminal device 110, the network device 120, and the storage device 130 are located in a same local area network. Such a local area network may be, for example, a Wi-Fi network.

In some embodiments, the example environment 100 may further include a cloud server (not shown). The cloud server may be connected to the terminal device 110 through a network, to implement control, remote monitoring, and resource sharing on the terminal device 110. For example, the cloud server may send a control command to the terminal device 110, to control the terminal device 110 to perform a specified operation, or monitor a status of the terminal device 110. In some embodiments, in addition to the terminal device 110, the cloud server may further manage a plurality of other devices owned by the user. For example, the cloud server may be used as a unified management platform for managing various devices such as a mobile phone, a television, and a tablet computer of the user. The cloud server may be separately connected to the terminal device 110 and the network device 120 through a network in any proper form, so that the network device 120 can control the terminal device 110 by using the cloud server, for example, the network device 120 can start a backup application in the terminal device 110 by using the cloud server. The network includes but is not limited to a wide area network (for example, the Internet), a local area network, a private network, a public network, a packet-based network, a wired network, or a wireless network.

Backup of the target data in the terminal device 110 is to be performed among the entities (to be specific, among the terminal device 110, the network device 120, the storage device 130, and the optional cloud server). A backup process may include two stages: a backup task creation stage and an automatic backup stage. The backup task creation stage is to initially set a backup task, so that an automatic backup can be performed subsequently after the terminal device 110 is connected to the network device 120. The automatic backup stage is to automatically back up the target data in the storage device 130 after the terminal device 110 is connected to the network device 120.

Specifically, for example, the user may create one backup task when the user wants to back up a specified directory in the terminal device 110 when the terminal device 110 is connected to the network device 120. Alternatively, the user may create one backup task when the user wants to back up the specified directory in the terminal device 110 at a specified time in the future (for example, 10 a.m. every Sunday), at a specified time interval from previous backup (for example, every 24 hours), or at a specified location (for example, when the user returns home). Therefore, the automatic backup can be implemented even if the terminal device 110 stays connected to the network device 120. In an example, when the user stays at home for a long period of time (for example, for more than 24 hours), even if the terminal device 110 stays connected to the network device 120, and the automatic backup cannot be triggered by a connection between the terminal device 110 and the network device 120, the automatic backup can still be triggered at the specified time interval from the previous backup.

In the backup task creation stage, the network device 120 may obtain device information of at least one candidate storage device connected to the network device 120, for example, the storage device 130-1 and the storage device 130-2. The terminal device 110 may request the device information of the storage device from the network device 120, may select a destination storage device, for example, the storage device 130-1 from the at least one candidate storage device indicated in the device information, and may select a destination directory for storing the target data in the destination storage device. In addition, the terminal device 110 may determine an identifier of a user account associated with the backup task and a password of the user account. In some embodiments, the identifier and the password may be generated by the storage device 130. For example, the storage device 130 may provide the user with the generated identifier and password, and the user may enter the identifier and the password into the terminal device 110 after obtaining the identifier and password. Alternatively, the identifier and the password may be an identifier and a password that are used when the terminal device 110 registers with the storage device 130, so that the terminal device 110 has permission to back up data in the storage device 130. The terminal device 110 may use, as login information, an identifier of the destination storage device (for example, the "storage device 130-1"), an identifier of the destination directory (for example, a "directory-1"), the identifier of the user account associated with the backup task, and the password of the user account, and sends the login information to the network device 120, so that the network device 120 verifies the login information by using the destination storage device. Therefore, after obtaining the login information from the terminal device 110, the network device 120 may create the backup task based on the device information and the login information.

In the automatic backup stage, the network device 120 may determine whether the terminal device 110 is connected to the network device 120. If the network device 120 determines that the terminal device 110 is connected to the network device 120, the network device 120 may determine whether a backup task associated with the terminal device 110 exists. Alternatively, the network device 120 may determine whether there is the specified time, whether there is the specified time interval from the previous backup, or whether there is the specified location. If the conditions set by the user are met, the network device 120 may also determine whether the backup task associated with the terminal device 110 exists. The backup task is used to store the to-be-backed-up target data in the terminal device 110 in the destination storage device in a plurality of storage devices 130, for example, the storage device 130-1. If the network device 120 determines that the backup task exists, the network device 120 may enable the terminal device 110 to start the backup task. In some embodiments, the network device 120 may enable the terminal device 110 to start the backup application. After starting the backup application, the terminal device 110 may send the target data to the network device 120. After receiving the target data, the network device 120 may forward the target data in the terminal device 110 to the destination storage device 130-1, to store the target data in the destination storage device 130-1.

In this manner, the terminal device can automatically perform the backup task when the terminal device is connected to the network device, to implement the automatic backup of the terminal device without a need to perform manual intervention. Therefore, backup efficiency and user experience are significantly improved.

Figure 2:
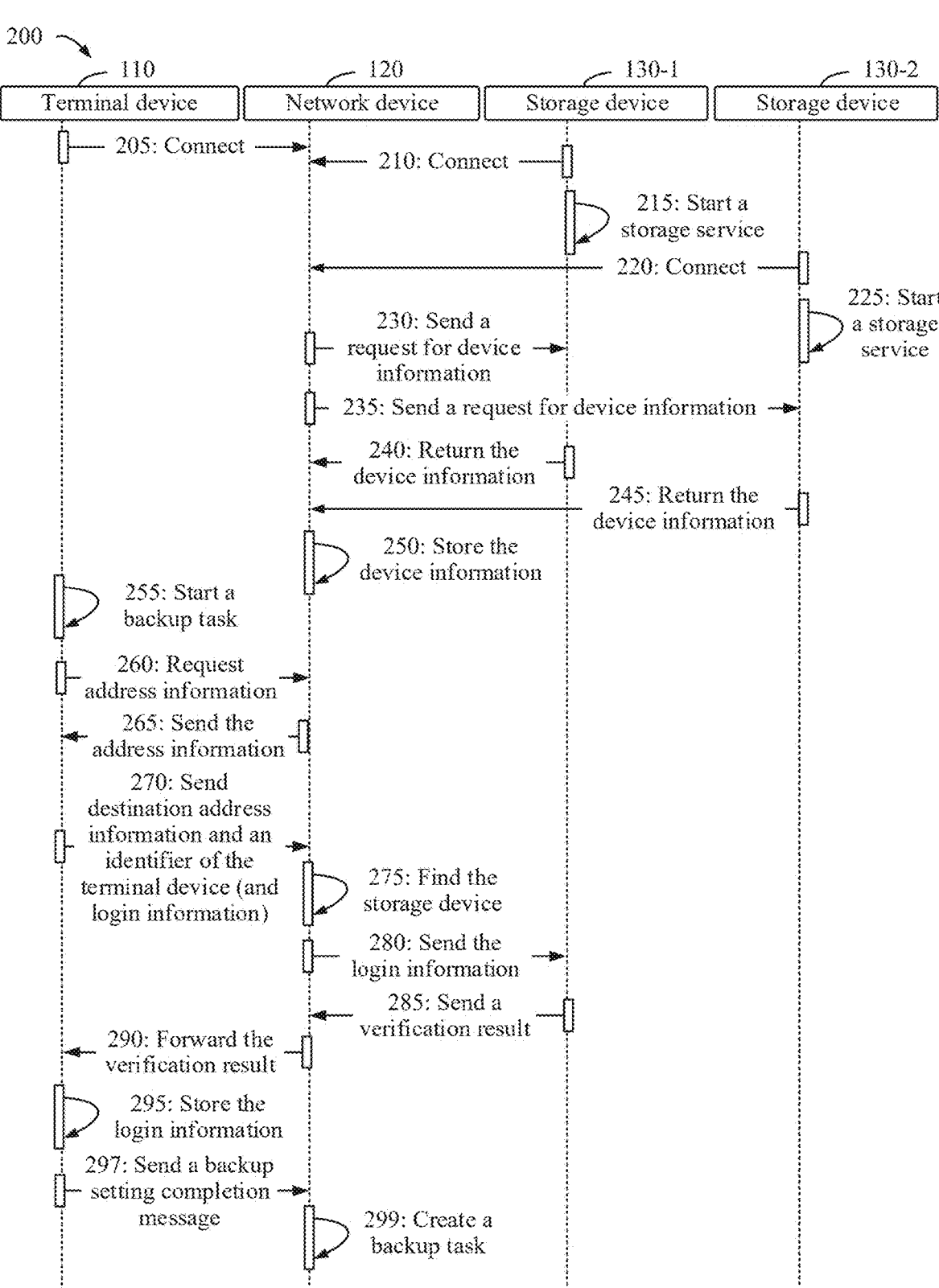
FIG. 2 is a schematic diagram of a backup task creation process according to some embodiments of this disclosure.
Figure 3:
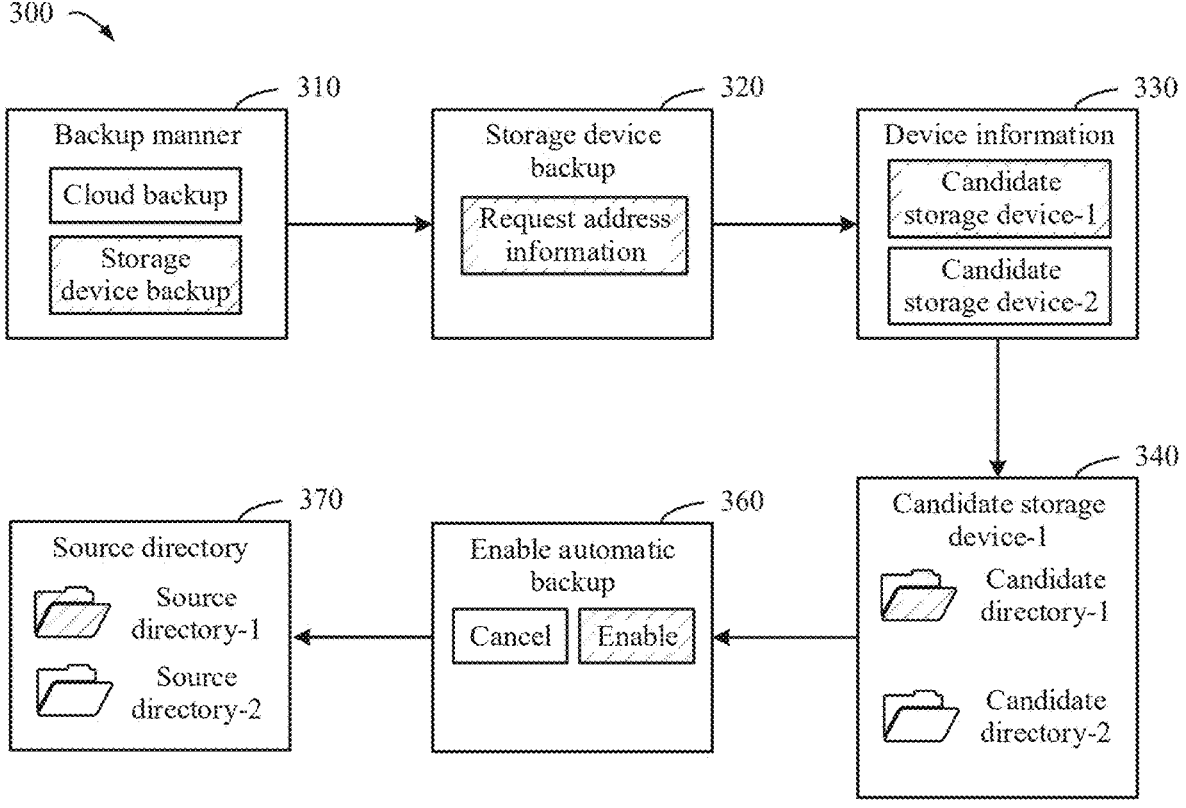
FIG. 3 is a schematic diagram of an example of an interface change existing in a backup task creation process according to some embodiments of this disclosure.
Figure 4:
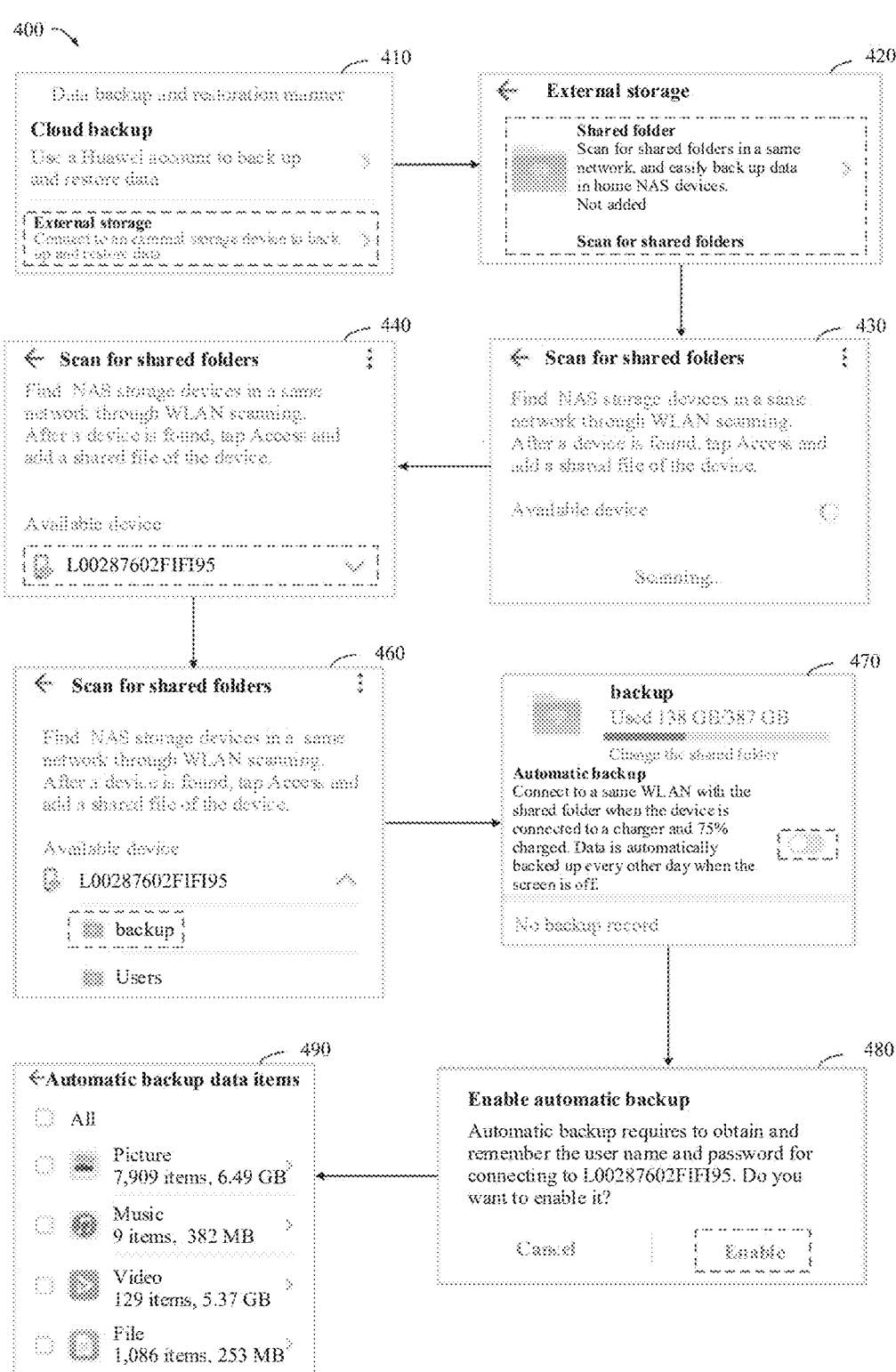
FIG. 4 is a schematic diagram of another example of an interface change existing in a backup task creation process according to some embodiments of this disclosure.

The following describes in detail operations performed by a terminal device 110, a network device 120, a storage device 130, and an optional cloud server with reference to FIG. 2 to FIG. 4. FIG. 2 is a schematic diagram of a backup task creation process 200 according to some embodiments of this disclosure. It should be understood that the process 200 may further include an additional step not shown and/or shown steps that may be omitted, and a scope of this disclosure is not limited in this aspect.

Step 205: The terminal device 110 is connected to the network device 120. For example, a user carrying the terminal device 110 may return home from an outside. The terminal device 110 may detect a Wi-Fi network provided by the network device 120 such as a router in a home of the user, and is connected to the network device 120 through the Wi-Fi network.

Step 210: A storage device 130-1 is connected to the network device 120.

Step 215: The storage device 130-1 starts a storage service after being connected to the network device 120. The storage service may be used to implement storage of data in the storage device 130.

Step 220: Similarly, a storage device 130-2 is connected to the network device 120.

Step 225: The storage device 130-2 starts a storage service after being connected to the network device 120. For example, when the storage device 130 is started or powered on, the storage device 130 may detect a network provided by the network device 120, is connected to the network device 120 through the network, and starts a storage service.

As described above, the terminal device 110, the network device 120, and the storage device 130 may be connected to each other by using a network in any proper form, including but not limited to a wide area network (for example, the Internet), a local area network, a private network, a public network, a packet-based network, a wired network, or a wireless network. It should be understood that the storage device 130-1 and the storage device 130-2 shown in FIG. 2 are merely an example, and there may be more or fewer storage devices 130.

Step 230: After detecting a connection of the storage device 130-1, the network device 120 sends a request for device information of the storage device 130-1 to the storage device 130-1.

Step 235: Similarly, after detecting a connection of the storage device 130-2, the network device 120 sends a request for device information of the storage device 130-2 to the storage device 130-2. For example, when determining that the storage device 130 is connected to the network device 120, the network device 120 may send a request for device information to the storage device 130.

Step 240: In response, the storage device 130-1 returns the device information of the storage device 130-1 to the network device 120.

Step 245: Similarly, the storage device 130-2 returns the device information of the storage device 130-2 to the network device 120.

Step 250: The network device 120 stores the device information transmitted in step 240 and step 245. In this manner, when finding that the storage device 130 is connected to the network device 120, the network device 120 can automatically obtain and store the device information of the storage device 130, to improve efficiency of a backup system.

Further, it should be understood that a sequence in which the terminal device 110, the storage device 130-1, and the storage device 130-2 are connected to the network device 120 (a sequence of step 205, step 210, step 215), a sequence in which the storage device 130-1 and the storage device 130-2 start the storage services (a sequence of step 215 and step 225), a sequence in which the network device 120 sends the request for device information to the storage device 130-1 and the storage device 130-2 (a sequence of step 230 and step 235), a sequence in which the storage device 130-1 and the storage device 130-2 return the device information (a sequence of step 240 and step 245) are merely an example. In fact, these actions may be performed between the terminal device 110, the storage device 130-1, the storage device 130-2, and the network device 120 in any proper sequence.

The device information may reflect a basic condition of the storage device 130. The device information may include, for example, an identifier of the storage device 130 and an address of the storage device 130. In some embodiments, the device information may further include, for example, an identifier of a directory used to store to-be-backed-up data in the storage device 130. The identifier of the storage device 130 may be information used to uniquely identify the storage device 130, for example, a name, a product serial number, and the like of the storage device 130. The identifier of the directory in the storage device 130 may be information used to uniquely identify the directory, for example, a directory name or a directory path. The directory may be shared with the terminal device 110, to store to-be-backed-up target data in the terminal device 110, and therefore, may also be referred to as a shared directory. In addition, the address of the storage device 130 may be information used to address the storage device 130, for example, an IP address, a MAC address, or a combination thereof.

Because the identifier of the storage device 130, the identifier of the directory, and the address in the device information are stored in association, a directory that can be provided by the storage device 130 may be easily determined based on the identifier of the storage device 130 if the identifier of the storage device 130 is learned of. In addition, the address of the storage device 130 may also be easily determined based on the identifier of the storage device 130, so that even if the address of the storage device 130 changes, a changed address that is of the storage device 130 and that is associated with the identifier of the storage device 130 may also be accurately determined based on the identifier of the storage device 130. Therefore, efficiency and stability of a backup system can be improved.

Step 255: The terminal device 110 starts a backup task. In some embodiments, the terminal device may start the backup task by starting a backup application. For example, the user may open the backup application when the user wants to create the backup task to perform automatic backup in the future. The backup application may be used to implement backup of data in the terminal device 110.

Step 260: After the backup task is started, the terminal device 110 requests address information of the storage device 130 from the network device 120. For example, the address information may include the identifier of the storage device 130. Alternatively, the address information may include the identifier of the storage device 130 and the identifier of the directory in the storage device.

Step 265: The network device 120 sends the address information in the obtained device information to the terminal device 110. If the terminal device 110 receives the address information from the network device 120, the terminal device 110 may select address information of a storage device (for example, the storage device 130-1) from the address information of the storage device 130 in response to an operation of the user (for example, a selection operation of the user) as address information of a destination storage device used to store the target data. In some embodiments, to ensure security of a backup operation, in addition to destination address information, the terminal device 110 needs to provide login information associated with the backup task for verification. For example, the login information may include an identifier of a user account (for example, a user name, an email address bound to the user account, or a phone number) and a password of the user account. It should be understood that the login information is unnecessary. For example, when the terminal device 110, the network device 120, and the destination storage device 130-1 are located in a same local area network, the terminal device 110 may not need to be verified based on the login information.

In this manner, the terminal device 110 can easily and accurately learn of a specific storage device 130 can be used to back up the target data and a specific directory that is provided in the storage device to back up the target data, and select a desired destination storage device and destination directory from the storage device 130 and the directory, to improve efficiency and accuracy of the backup system. In addition, security of the backup system can be improved by providing the login information for verification.

Step 270: The terminal device 110 sends destination address information of the selected destination storage device 130-1, the identifier of the terminal device 110, and the optional login information to the network device 120. In addition, in some embodiments, the terminal device 110 may further set a source directory from which the target data originates, to back up target data in the source directory in a future automatic backup stage. For example, the terminal device 110 may determine an identifier of the source directory of the target data, and send the identifier of the source directory to the network device 120.

It should be understood that the terminal device 110 does not need to send the login information when the login information does not need to be verified. Therefore, step 275 to step 295 are omitted, and step 297 to step 299 are directly performed. In other words, the terminal device 110 sends a backup setting completion message to the network device 120. The backup setting completion message indicates that a backup setting performed by the terminal device 110 in response to receiving a verification result is completed. In addition, after receiving the backup setting completion message from the terminal device 110, the network device 120 creates the backup task based on an identifier of the terminal device, the destination address information, and the identifier of the optional source directory.

However, the terminal device 110 further sends the login information when the login information needs to be verified. Step 275: The network device 120 finds the destination storage device 130-1 based on the destination address information. In some embodiments, the network device 120 determines, based on the destination address information obtained from the terminal device 110 and the stored device information, an address of the destination storage device 130-1 for storing the target data. In some embodiment, the network device 120 may obtain the identifier of the destination storage device 130-1 from the destination address information, and determine, from the device information, an identifier of a storage device that matches the identifier of the destination storage device 130-1, to determine that an address of a storage device associated with the identifier of the storage device is the address of the destination storage device 130-1.

In this manner, the network device 120 can determine the identifier of the destination storage device based on the destination address information from the terminal device 110, and quickly and accurately retrieve an address of the destination storage device in the device information based on the identifier of the destination storage device. Therefore, the address of the destination storage device may be determined and managed by the network device 120, and the terminal device 110 does not need to learn of the address of the destination storage device. In this case, when the address of the destination storage device changes, the network device 120 may address the destination storage device without a need to update the destination address information in the terminal device 110. Therefore, efficiency and stability of the backup system can be improved.

Step 280: The network device 120 sends the login information to the destination storage device 130-1 based on the address of the destination storage device 130-1 for verification.

Step 285: The destination storage device 130-1 sends a verification result to the network device 120.

Step 290: The network device 120 forwards the received verification result to the terminal device 110.

Step 295: The terminal device 110 stores the login information when the verification result indicates that the login information is successfully verified. In addition, in some embodiments, the terminal device 110 may further store the destination address information.

Step 297: After completing these operations, the terminal device 110 sends the backup setting completion message to the network device 120. The backup setting completion message indicates that the backup setting performed by the terminal device 110 in response to receiving the verification result is completed.

Step 299: The network device 120 creates the backup task. For example, after receiving the backup setting completion message from the terminal device 110, the network device 120 creates the backup task based on the identifier of the terminal device, the destination address information, and the identifier of the optional source directory. In this manner, the security of the backup system can be improved through verification, and the backup task can be conveniently created after the backup setting is completed.

In addition, in some embodiments, the network device 120 may further store the login information and the destination address information. Therefore, in a subsequent automatic backup stage, the terminal device 110 does not need to send the login information and the destination address information to the network device 120 for verification and addressing. Instead, after detecting a connection of the terminal device 110, the network device 120 directly sends the stored login information for the terminal device 110 to a destination storage device indicated by the stored destination address information, and then verification is performed. In this manner, efficiency of the backup system can be improved, and data transmission between the terminal device 110 and the network device 120 can be reduced.

In this manner, in an initial stage, after the terminal device is connected to the network device, the backup task can be conveniently created, to implement automatic backup of data in the terminal device in a subsequent stage, and improve backup efficiency and user experience. It should be understood that a connection between the terminal device and the network device in the initial stage is different from a connection between the terminal device and the network device in the subsequent automatic backup stage. In an example, in the initial stage, after the terminal device is connected to the network device and creation of the backup task is completed, the connection between the terminal device and the network device may be broken. For example, the user may carry the terminal device and leave a network coverage range of the network device. However, in a subsequent stage, when the user re-enters the network coverage range of the network device, the terminal device may be reconnected to the network device, to trigger execution of the automatic backup.

The foregoing describes operations performed by a terminal device 110, a network device 120, and a storage device 130 in a backup task creation stage. To further facilitate understanding, FIG. 3 is a schematic diagram 300 of an interface change in a terminal device 110 in a backup task creation process according to some embodiments of this disclosure.

After initiating a backup application, the terminal device 110 may display an interface 310. Options of backup manners are shown in the interface 310. It should be understood that although an option "Cloud backup" and an option "Storage device backup" are shown in the interface 310, the option "Cloud backup" and the option "Storage device backup" are merely examples. In fact, the cloud may also be considered as a storage device, so that there is only one backup manner, or there can be more other backup manners.

It is assumed that a user selects a storage device backup manner, the terminal device 110 may display an interface 320, and an option "Request address information" is shown in the interface 320. When the user selects the option "Request address information", the terminal device 110 sends a request for address information to the network device 120. After the terminal device 110 receives the address information returned by the network device 120, the terminal device 110 may display an interface 330. Information that is about the storage device 130 and that is included in the device information is shown in the interface 330. A candidate storage device-1 and a candidate storage device-2 may respectively correspond to a storage device 130-1 and a storage device 130-2. It should be understood that storage devices shown in the interface 330 and a quantity of storage devices are merely examples, the storage device may be any proper storage device, and there is any proper quantity.

It is assumed that the user selects the candidate storage device-1, the terminal device 110 may display an interface 340, and a candidate directory-1 and a candidate directory-2 that may be used to back up target data in the candidate storage device-1 are shown in the interface 340. It should be understood that directories shown in the interface 340 and a quantity of directories are merely examples, the directory may be any proper directory, and there is any proper quantity.

It is assumed that the user selects the candidate directory-1, the terminal device 110 may display an interface 360, and an option of whether to enable automatic backup is shown in the interface 360. If the user selects an option "Enable", the terminal device 110 displays an interface 370, and source directory options are shown in the interface 370. After a source directory to be backed up is selected, the terminal device may store the selected source directory, and send a backup setting completion message to the network device 120, so that the network device 120 creates a backup task.

It should be understood that the interfaces are merely examples, and any proper interface display and layout may be used. For example, the interface 330 and the interface 340 may be displayed in combination. In the interfaces displayed in combination, options of candidate storage devices and candidate directories are provided. In another example, it is assumed that the terminal device 110 may display a login information interface after the user selects the candidate directory-1. In the interface, an identifier of a user account and a password of the user account may be entered. Therefore, the terminal device 110 may obtain login information, and may send the login information to the network device 120 for verification.

FIG. 4 is a schematic diagram 400 of another example of an interface change existing in a backup task creation process according to some embodiments of this disclosure. Compared with the schematic diagram 300 of the interface change in FIG. 3, the schematic diagram 400 of the interface change in FIG. 4 is more detailed, and may be considered as a screenshot of an interface change displayed on a terminal device 110. It should be understood that an interface in FIG. 4 is merely an example, and any proper interface display and layout may be used.

After initiating a backup application, the terminal device 110 may display an interface 410. Options of backup manners are shown in the interface 410. It should be understood that although an option "Cloud backup" and an option "External storage backup" are shown in the interface 410, the option "Cloud backup" and the option "External storage backup" are merely examples. In fact, the cloud may also be considered as an external storage, so that there is only one backup manner, or there can be more other backup manners.

It is assumed that a user selects an external storage backup manner, the terminal device 110 may display an interface 420, and an option "Shared folder" is shown in the interface 420. When the user selects the option "Shared folder", as shown in the interface 430, the terminal device 110 scans the shared folder for an available storage device 130. Therefore, the terminal device 110 sends a request for address information of the available storage device 130 to a network device 120. After the terminal device 110 receives the address information returned by the network device 120, the terminal device 110 may display an interface 440. Information that is about the available storage device 130 and that is included in device information may be shown in the interface 440, for example, a name "L00287602FIFI95" of the available storage device 130.

It is assumed that the user selects the indicated available storage device 130 "L00287602FIFI95", the terminal device 110 may display an interface 460, and a candidate directory used to back up target data in the available storage device 130 "L00287602FIFI95" is shown in the interface 460, for example, candidate directories "backup" and "Users". It should be understood that directories shown in the interface 460 and a quantity of directories are merely examples, the directory may be any proper directory, and there is any proper quantity. It should be noted that, if the storage device needs to be logged in to, when the user selects the storage device 130 "L00287602FIFI95" in the interface 440, the user needs to enter a user name and a password for login. In other words, an input box is displayed in the display interface. After the user enters the user name and the password, the terminal device 110 sends content entered by the user to the storage device 130 for verification. The terminal device 110 displays the interface 460 only after verification succeeds. If the storage device does not need to be logged in to, the terminal device may directly display the interface 460 after the user selects the storage device 130.

It is assumed that the user selects the candidate directory "backup", the terminal device 110 may display an interface 470, and an option of whether to enable automatic backup is shown in the interface 470. If the user chooses to enable the automatic backup, the terminal device 110 displays the interface 480. When login information needs to be verified, the interface 480 notifies the user that if the automatic backup is enabled, the terminal device 110 stores the login information, for example, an identifier and a password of a user account. If the user still chooses to enable the automatic backup, the terminal device 110 stores the login information, and displays an interface 490. Options of source directories are shown in the interface 490. The source directory may be, for example, a picture directory, a music directory, a video directory, or a file directory on the terminal device 110. After a source directory to be backed up is selected, the terminal device 110 may store the selected source directory, and send a backup setting completion message to the network device 120, so that the network device 120 creates a backup task.

In the following, operations performed by a terminal device 110, a network device 120, a destination storage device (a storage device 130-1 is used as an example), and an optional cloud server 501 in an automatic backup stage are described with reference to FIG. 5.

Figure 5:
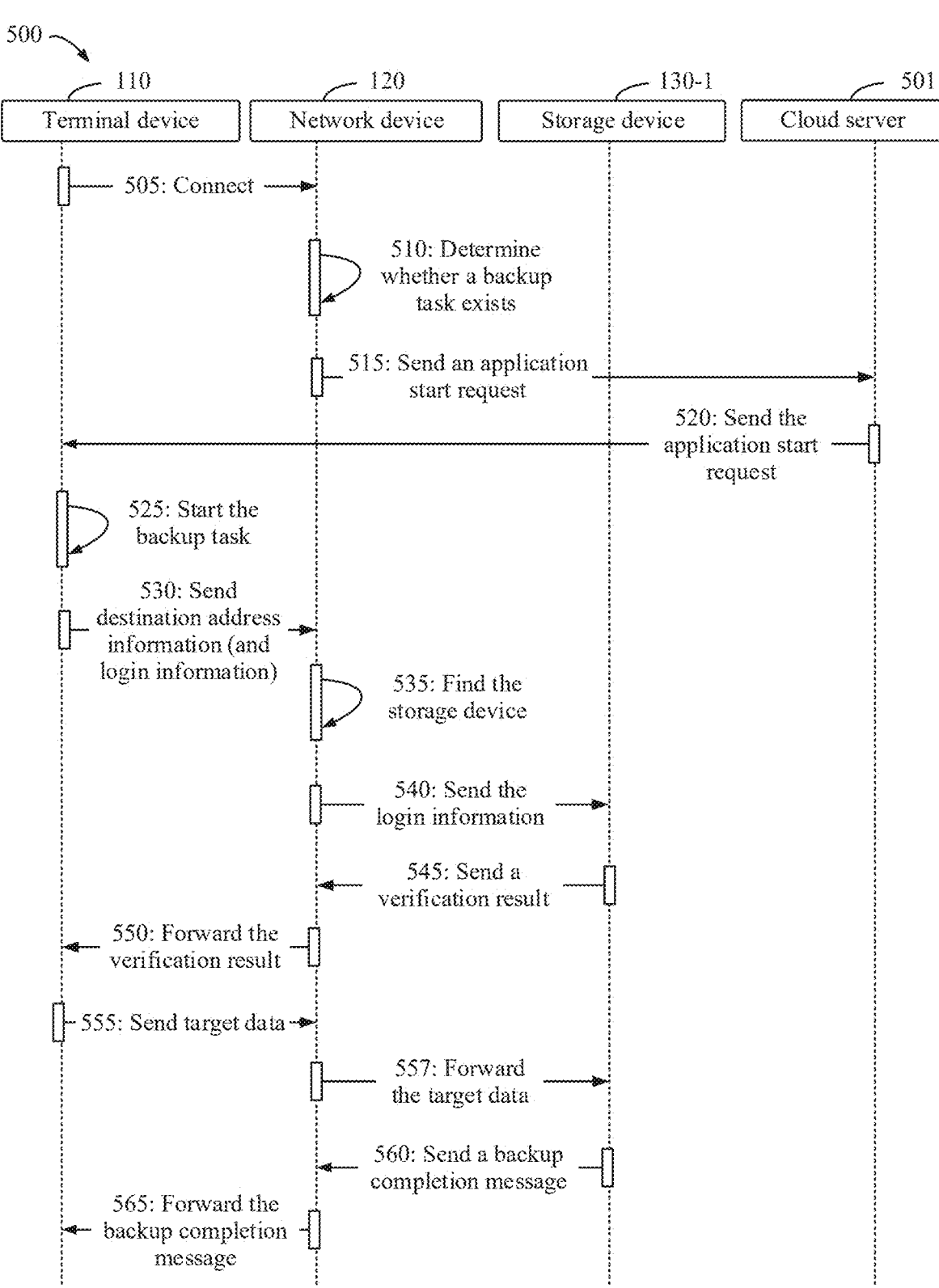
FIG. 5 is a schematic diagram of an automatic backup process according to some embodiments of this disclosure.

FIG. 5 is a schematic diagram of an automatic backup process 500 according to some embodiments of this disclosure. It should be understood that an additional step that is not shown may be included, and/or a shown step may be omitted in the process 500. A scope of this disclosure is not limited in this aspect.

Step 505: The terminal device 110 is connected to the network device 120. For example, a user carrying the terminal device 110 may return home from outside. The terminal device 110 may detect a Wi-Fi network provided by the network device 120 such as a router in the home of the user, and is connected to the network device 120 through the Wi-Fi network. As described above, the terminal device may be connected to the network device 120 through a network in any proper form, including but not limited to a wide area network (for example, the Internet), a local area network, a private network, a public network, a packet-based network, a wired network, or a wireless network.

Step 510: If the network device 120 determines that the terminal device 110 is connected to the network device 120, the network device 120 determines whether a backup task associated with the terminal device 110 exists. For example, the network device 120 may determine whether the network device 120 stores the backup task associated with the terminal device 110. As described above, the backup task is created in advance in a backup task creation stage, and is used to automatically back up to-be-backed-up target data in the terminal device 110 in the destination storage device 130-1.

Step 515; If the network device 120 determines that the backup task exists, the network device 120 indicates the terminal device 110 to start the backup task. For example, the network device 120 may send an application start request to the cloud server 501 of the terminal device 110, so that the cloud server 501 starts a backup application in the terminal device 110.

Step 520: After receiving the application start request from the network device 120, the cloud server 501 sends the application start request to the terminal device 110, to indicate the terminal device 110 to start the backup application. For example, the cloud server 501 may send, to the terminal device 110, an application start request that includes an identifier of a to-be-started backup application, to notify the terminal device 110 to start the backup application. For example, the cloud server may pull up the backup application in the terminal device 110 based on a push message. Optionally, the network device 120 may alternatively directly send the application start request to the terminal device 110, to indicate the terminal device 110 to start the backup application without using the cloud server 501.

Step 525: The terminal device 110 starts the backup task. For example, after receiving the application start request, the terminal device 110 starts the backup application, to start the backup task. In this manner, after it is detected that the terminal device 110 is connected to the network device 120, the backup application can be automatically started without a need to perform manual intervention, to start the backup task. Therefore, backup efficiency and user experience are improved.

After starting the backup task, the terminal device 110 sends destination address information, target data, and optional login information to the network device 120. The following first describes, with reference to FIG. 5, a case in which the terminal device 110 needs to be verified. In other words, a case of sending the login information is first described.

Step 530: After starting the backup task, the terminal device 110 sends the destination address information and the login information to the network device 120 for verification. As described above, the destination address information and the login information are preset and stored in the backup task creation stage. The destination address information may include an identifier of the destination storage device 130-1 and an identifier of a destination directory used to store the target data in the destination storage device 130-1. The login information may include an identifier of a user account associated with the backup task, and a password of the user account. In this manner, the destination storage device and the destination directory can be easily determined, and security of a backup system is improved.

Step 535: After obtaining the destination address information and the login information from the terminal device 110, the network device 120 determines an address of the destination storage device 130-1 based on the destination address information and device information of a storage device 130. As described above, the device information is obtained and prestored in the backup task creation stage, and includes an identifier of the storage device 130, an identifier of a candidate directory used to store to-be-backed-up data in the optional storage device 130, and an address of the storage device 130. In some embodiments, the network device 120 may obtain the identifier of the destination storage device 130-1 from the destination address information, and determine, based on the device information, an identifier of a storage device that matches the identifier of the destination storage device 130-1, to determine that an address of a storage device associated with the identifier of the storage device is the address of the destination storage device 130-1.

Step 540: The network device 120 sends the login information to the destination storage device 130-1 based on the address of the destination storage device 130-1.

In this manner, the network device 120 can determine the identifier of the destination storage device based on the destination address information from the terminal device 110, and quickly and accurately retrieve an address of the destination storage device in the device information based on the identifier of the destination storage device. Therefore, the address of the destination storage device may be determined and managed by the network device 120, and the terminal device 110 does not need to learn of the address of the destination storage device. In this case, when the address of the destination storage device changes, the network device 120 may address the destination storage device without a need to update the destination address information in the terminal device 110. Therefore, efficiency and stability of the backup system can be improved.

Alternatively, in some embodiments, the network device 120 prestores the destination address information and the login information in the backup task creation stage. In this case, the terminal device 110 does not need to send destination address information and the login information to the network device 120 for verification; instead, the network device 120 directly sends the stored login information to a destination storage device indicated by the stored destination address information for verification. In this manner, efficiency of the backup system can be improved, and data transmission between the terminal device 110 and the network device 120 can be reduced.

Step 545: The destination storage device 130-1 sends a verification result to the network device 120.

Step 550: The network device 120 forwards the received verification result to the terminal device 110.

Step 555: When the verification result indicates that the login information is successfully verified, the terminal device 110 sends the target data to the network device 120.

Step 557: After receiving the target data, the network device 120 forwards the target data to the destination storage device 130-1, to store the target data in the destination storage device 130-1.

Alternatively, the terminal device 110 may directly send the target data to the destination storage device 130-1, to store the target data in the destination storage device 130-1.

In some embodiments, the target data may be backed up in an incremental backup manner. For example, the terminal device 110 may obtain a time at which a previous backup operation is initiated, and use, as the target data, data updated after the time in a source directory of the terminal device 110, to store the target data in the destination storage device 130-1. In some embodiments, the time of the previous backup operation may be set to a default value, for example, zero during initial backup. Therefore, during the initial backup, all data in the source directory of the terminal device 110 is backed up. In this manner, data is backed up in the incremental backup manner, to significantly reduce costs of data transmission and the backup operation, and greatly improve performance of a storage system. It should be understood that the target data may also be backed up in any proper backup manner. For example, a full backup manner of backing up all data may be used.

In addition, in some embodiments, the target data may be backed up in an encrypted backup manner. For example, the login information may further include a password for encrypting the target data, so that the destination storage device 130-1 can decrypt the received encrypted target data. It should be understood that the target data may also be encrypted in any proper encryption manner, and the terminal device 110 and the destination storage device 130-1 may negotiate the password in any proper manner. Alternatively, the target data may be backed up in an unencrypted or plaintext manner. In this manner, security of the backup operation can be improved, and the backup operation is performed at a security level expected by the user.

Step 560: After the backup is completed, the destination storage device 130-1 may send a backup completion message to the network device 120.

Step 565: After receiving the backup completion message, the network device 120 forwards the message to the terminal device 110.

Alternatively, after the backup is completed, the destination storage device 130-1 may directly send the backup completion message to the terminal device 110.

When the terminal device 110 does not need to be verified, the terminal device 110 does not need to send the login information, but directly sends the destination address information and the target data. After receiving the target data, the network device 120 forwards the target data to the destination storage device 130-1, to store the target data in the destination storage device 130-1. After the backup is completed, the destination storage device 130-1 may send the backup completion message to the network device 120. After receiving the backup completion message, the network device 120 forwards the message to the terminal device 110.

In this manner, the backup task associated with the terminal device can be created in the network device, so that when detecting that the terminal device is connected, the network device can enable the terminal device to start the backup operation. In this manner, the backup application in the terminal device does not need to run in the background for a long period of time, and a problem that the automatic backup cannot be implemented when running of the backup application is forced to stop is avoided. In addition, the backup application does not need to continuously perform periodic detection, so that resources can be saved. This improves efficiency of the terminal device and reduces power consumption. Further, because the network device manages the address of the storage device and sends the login information to the storage device, the terminal device does not need to provide or learn of the address of the storage device. In this case, the network device can still correctly and accurately address the storage device even if the address of the storage device changes.

Figure 6:
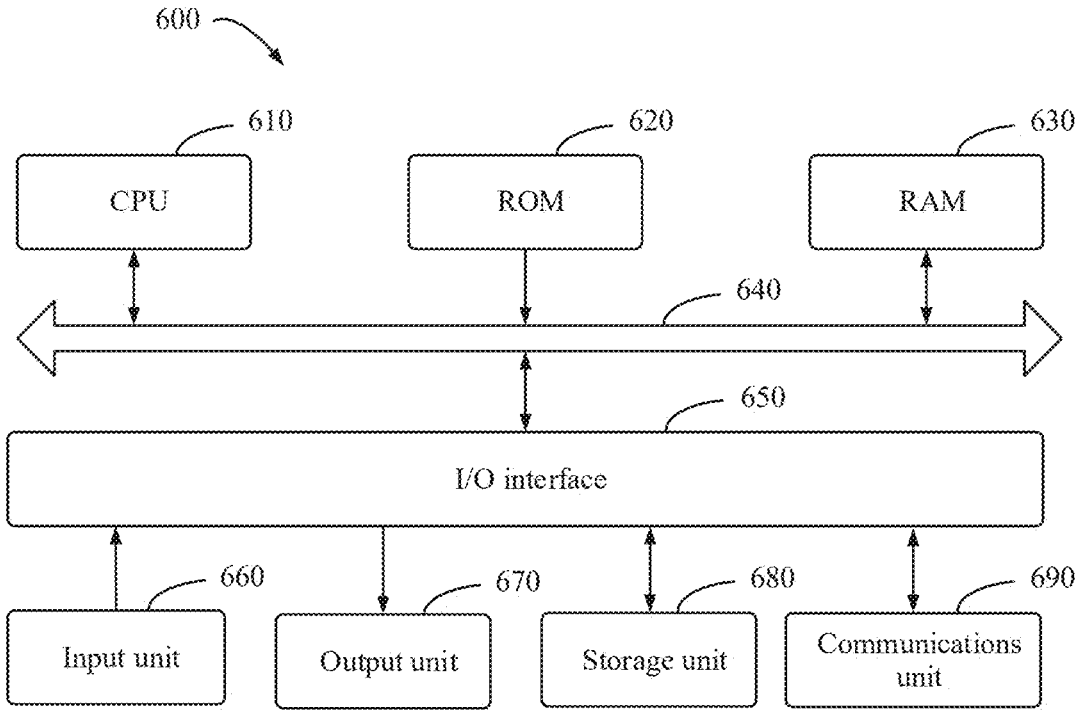
FIG. 6 is a block diagram of an example device applicable to implementing embodiments of this disclosure.

FIG. 6 is a block diagram of an example device 600 applicable to implementing embodiments of this disclosure. For example, the terminal device 110 or the network device 120 in FIG. 1 may be implemented by the device 600. As shown in FIG. 6, the device 600 includes a central processing unit (CPU) 610, and the central processing unit 610 may perform various proper actions and processing based on computer program instructions stored in a read-only memory (ROM) 620 or computer program instructions loaded from a storage unit 680 into a random access memory (RAM) 630. The RAM 630 may further store various programs and data required for an operation of the device 600. The CPU 610, the ROM 620, and the RAM 630 are connected to each other through a bus 640. An input/output (I/O) interface 650 is also connected to the bus 640.

A plurality of components in the device 600 are connected to the I/O interface 650, and include an input unit 660, for example, a keyboard or a mouse; an output unit 670, for example, various types of displays or speakers; a storage unit 680, for example, a magnetic disk or an optical disk; and a communications unit 690, for example, a network card interface, a modem, or a wireless communications transceiver. The communications unit 690 allows the device 600 to exchange information/data with another device through a computer network of the Internet, various telecommunications networks, and/or the like.

The processes and processing described above, for example, the method 200 and the method 500, may be performed by the processing unit 610. For example, in some embodiments, a method 1100 may be implemented as a computer software program, and may be tangibly included in a machine-readable medium, for example, the storage unit 680. In some embodiments, some or all computer programs may be loaded and/or mounted on the device 600 by using the ROM 602 and/or the communications unit 690. When the computer program is loaded into the RAM 630 and executed by the CPU 610, one or more actions in the method 200 and the method 500 described above may be performed.

This disclosure may be a method, an apparatus, a system, and/or a computer program product. The computer program product may include a computer-readable storage medium, and the computer-readable storage medium carries computer-readable program instructions for performing various aspects of this disclosure.

The computer-readable storage medium may be a tangible device that may hold and store instructions to be used by an instruction execution device. The computer-readable storage medium may be, by way of example and without limitation, an electrical storage device, a magnetic storage device, an optical storage device, an electromagnetic storage device, a semiconductor storage device, or any proper combination thereof. More specific examples (non-exhaustive list) of the computer-readable storage medium include a portable computer disk, a hard disk drive, a random access memory (RAM), a read-only memory (ROM), an erasable programmable read only memory (EPROM or flash memory), a static random access memory (SRAM), a portable compact disc read-only memory (CD-ROM), a digital versatile disc (DVD), a memory stick, a floppy disk, a mechanical encoding device, for example, a punched card in which instructions are stored or a convex structure in a groove, and any proper combinations thereof. The computer-readable storage medium used herein is not to be construed as a transient signal, for example, a radio wave or another freely propagating electromagnetic wave, an electromagnetic wave propagating through a waveguide or another transmission medium (for example, an optical pulse passing through an optical fiber cable), or an electrical signal transmitted through a wire.

The computer-readable program instructions described herein may be downloaded from the computer-readable storage medium to each computing/processing device, or to an external computer or external storage device through a network, for example, the Internet, a local area network, a wide area network, and/or a wireless network. The network may include a copper transmission cable, optical transmission, wireless transmission, a router, a firewall, a switch, a gateway computer, and/or an edge server. A network interface card or network interface in each computing/processing device receives computer-readable program instructions from the network, and forwards the computer-readable program instructions, so that the computer-readable program instructions are stored in the computer-readable storage medium in each computing/processing device.

The computer program instructions used to perform an operation in this disclosure may be assembly instructions, instruction set architecture (ISA) instructions, machine instructions, machine dependent instructions, microcode, firmware instructions, state setting data, or source code or target code written in any combination of one or more programming languages. The programming languages include an object-oriented programming language such as Smalltalk or C++ and a conventional procedural programming language such as "C" or a similar programming language. The computer-readable program instructions may be completely executed on a user computer, partially executed on a user computer, executed as a separate software package, partially executed on a user computer and partially executed on a remote computer, or completely executed on a remote computer or a server. In a case of the remote computer, the remote computer may be connected to the user computer through any type of network, including a local area network (LAN) or a wide area network (WAN), or may be connected to an external computer (for example, through the Internet by using an Internet service provider). In some embodiments, an electronic circuit is customized based on state information of the computer-readable program instruction, for example, a programmable logic circuit, a field programmable gate array (FPGA), or a programmable logic array (PLA), so that the electronic circuit can execute the computer-readable program instruction, to implement various aspects of this disclosure.

Aspects of this disclosure are described herein with reference to a flowchart and/or a block diagram of the method, the apparatus (system), and the computer program product in embodiments of this disclosure. It should be understood that each block in the flowchart and/or block diagram and a combination of blocks in the flowchart and/or block diagram may be implemented based on the computer-readable program instructions.

The computer-readable program instructions may be provided to a processing unit of a general-purpose computer, a special-purpose computer, or another programmable data processing apparatus, to produce a machine, so that when the instructions are executed by the processing unit of the computer or the another programmable data processing apparatus, an apparatus for implementing a function/action specified in one or more blocks in the flowchart and/or block diagram is generated. The computer-readable program instructions may also be stored in the computer-readable storage medium. The instructions enable a computer, a programmable data processing apparatus, and/or another device to operate in a particular manner, so that the computer-readable medium storing the instructions includes an artifact, and the artifact includes instructions for implementing various aspects of a function/action specified in one or more blocks in the flowchart and/or block diagram.

The computer-readable program instructions may also be loaded onto a computer, another programmable data processing apparatus, or another device, so that a series of operation steps are performed on the computer, the another programmable data processing apparatus, or the another device to produce a computer-implemented process, and instructions executed on the computer, the another programmable data processing apparatus, or the another device implement the function/action specified in one or more blocks in the flowchart and/or block diagram.

The flowchart and/or block diagram in the accompanying drawings show a system architecture, a function, and an operation of a possible implementation of the system, the method, and the computer program product in a plurality of embodiments of this disclosure. In this case, each block in the flowchart or block diagram may represent a module, a program segment, or a part of instructions, and the module, the program segment, or the part of instructions includes one or more executable instructions for implementing a specified logical function. In some alternative implementations, a function noted in the block may alternatively occur in an order different from that noted in the accompanying drawings. For example, two consecutive blocks may be actually executed basically in parallel, and may sometimes be executed in a reverse sequence, depending on used functions. It should be further noted that each block in the block diagram and/or flowchart and a combination of blocks in the block diagram and/or flowchart may be implemented by a dedicated hardware-based system that performs a specified function or action, or may be implemented by a combination of dedicated hardware and computer instructions.

Embodiments of this disclosure are described above, and the descriptions are an example, but are not exhaustive, and is not limited to the disclosed embodiments. Many modifications and changes are apparent to one of ordinary skill in the art without departing from the scope and spirit of the illustrated embodiments. The terms used in this specification are selected to best explain a principle of embodiments, an actual application, or an improvement in the technology in the market, or to enable another person of ordinary skill in the art to understand embodiments disclosed in this specification.

What is claimed is:

1. A method, comprising:
connecting, by a network device, to a terminal device;
determining, by the network device, whether a backup task associated with the terminal device exists, wherein the backup task is used to store to-be-backed-up target data in the terminal device into a destination storage device, and the destination storage device is connected to the network device;
in response to at least that the backup task exists, indicating, by the network device, the terminal device to start the backup task, to store the target data in the destination storage device, wherein indicating the terminal device to start the backup task comprises sending, by the network device, an application start request to a cloud server of the terminal device, to indicate the cloud server to start a backup application in the terminal device;
after indicating the terminal device to start the backup task to store the target data in the destination storage device, receiving, by the network device, destination address information and the target data that are sent by the terminal device; and
determining, by the network device, the destination storage device based on the destination address information.

2. The method according to claim 1, wherein the method further comprises:
sending, by the network device, the target data to the destination storage device.

3. The method according to claim 2, wherein:
the destination address information comprises an identifier of the destination storage device; or
the destination address information comprises an identifier of the destination storage device and an identifier of a destination directory in the destination storage device.

4. The method according to claim 2, wherein the finding, by the network device, the destination storage device based on the destination address information comprises:
determining, by the network device, an address of the destination storage device based on the destination address information and device information of at least one candidate storage device connected to the network device.

5. The method according to claim 4, wherein:
the device information comprises: an identifier of the at least one candidate storage device and an address of the at least one candidate storage device; or
the device information comprises: an identifier of the at least one candidate storage device, an identifier of a candidate directory in the at least one candidate storage device, and an address of the at least one candidate storage device.

6. The method according to claim 4, wherein the determining an address of the destination storage device comprises:
obtaining, by the network device, an identifier of the destination storage device from the destination address information;

determining, by the network device, from the device information, an identifier of a candidate storage device that matches the identifier of the destination storage device; and determining, by the network device, that an address of a candidate storage device associated with the identifier of the candidate storage device is the address of the destination storage device.

7. The method according to claim 4, wherein before the determining, by the network device, whether a backup task associated with the terminal device exists, the method further comprises:

obtaining, by the network device, the device information of the at least one candidate storage device connected to the network device;

sending, by the network device, address information of the at least one candidate storage device in the device information to the terminal device, wherein the address information comprises an identifier of the at least one candidate storage device, or the address information comprises the identifier of the at least one candidate storage device and an identifier of a directory in the at least one candidate storage device;

obtaining, by the network device, an identifier of the terminal device and the destination address information from the terminal device, wherein the destination address information is at least one piece of address information in the address information of the at least one candidate storage device; and creating, by the network device, the backup task based on the identifier of the terminal device and the destination address information.

8. The method according to claim 2, wherein before the sending, by the network device, the target data to the destination storage device, the method further comprises:

receiving, by the network device, login information sent by the terminal device;

sending, by the network device, the login information to the destination storage device for verification; and in response to at least a success of the verification, performing, by the network device, the sending the target data to the destination storage device.

9. A method, comprising:

connecting, by a terminal device, to a network device;

starting, by the terminal device, a backup task in response to an indication of the network device, wherein the backup task is used to store to-be-backed-up target data in the terminal device into a destination storage device, and the destination storage device is connected to the network device, wherein the indication of the network device comprises receiving, by the terminal device, an application start request from a cloud server that receives the application start request from the network device, wherein the application start request indicates the terminal device to start a backup application in the terminal device; and after receiving the indication of the network device to start the backup task to store the target data in the destination storage device:

sending, by the terminal device, the target data to the network device, to store the target data in the destination storage device; and sending, by the terminal device, destination address information to the network device, wherein the destination address information is used to determine the destination storage device.

10. The method according to claim 9, wherein:

the destination address information comprises an identifier of the destination storage device; or the destination address information comprises an identifier of the destination storage device and an identifier of a destination directory in the destination storage device.

11. The method according to claim 9, wherein the sending, by the terminal device, the target data to the network device comprises:

obtaining, by the terminal device, a time of a previous backup operation; and using, by the terminal device, data updated after the time of the previous backup operation in the terminal device as the target data; and sending, by the terminal device, the data to the network device.

12. The method according to claim 9, wherein before the starting, by the terminal device, a backup task, the method further comprising:

requesting, by the terminal device from the network device, address information of at least one candidate storage device connected to the network device, wherein the address information comprises an identifier of the at least one candidate storage device, or the address information comprises an identifier of the at least one candidate storage device and an identifier of a directory in the at least one candidate storage device;

selecting, by the terminal device, one piece of address information from the address information of the at least one candidate storage device as destination address information in response to an operation of a user; and sending, by the terminal device, an identifier of the terminal device and the destination address information to the network device for creating the backup task.

13. The method according to claim 9, wherein before the sending, by the terminal device, the target data to the network device, the method further comprises:

sending, by the terminal device, login information to the destination storage device by using the network device for verification of the terminal device; and in response to at least a success of the verification, performing, by the terminal device, the sending the target data to the network device.

14. A system, comprising a terminal device, a network device, and at least one storage device, wherein:

the terminal device is connected to the network device;

the at least one storage device is connected to the network device;

after the terminal device is connected to the network device, the network device determines whether a backup task associated with the terminal device exists, wherein the backup task is used to store to-be-backed-up target data in the terminal device into a destination storage device, and the destination storage device is one of the at least one storage device;

in response to determining that the backup task exists, the network device indicates the terminal device to start the backup task, wherein indicating the terminal device to start the backup task comprises sending, by the network device, an application start request to a cloud server of the terminal device, to indicate the cloud server to start a backup application in the terminal device;

after receiving an indication of the network device to start the backup task to store the target data in the destination storage device, the terminal device sends destination address information and the target data to the network device;

the network device determines the destination storage device based on the destination address information;

the network device sends the target data to the destination storage device; and the destination storage device stores the target data.

15. The system according to claim 14, wherein:

the destination address information comprises an identifier of the destination storage device; or the destination address information comprises an identifier of the destination storage device and an identifier of a destination directory in the destination storage device.

16. The system according to claim 15, wherein that the network device finds the destination storage device based on the destination address information comprises:

the network device determines an address of the destination storage device based on the destination address information and device information of at least one candidate storage device connected to the network device, wherein:

the device information comprises an identifier of the at least one candidate storage device and an address of the at least one candidate storage device; or the device information comprises an identifier of the at least one candidate storage device, an identifier of a candidate directory in the at least one candidate storage device, and an address of the at least one candidate storage device.

17. The system according to claim 16, wherein the network device creates the backup task before the network device determines whether the backup task associated with the terminal device exists;

that the network device creates the backup task comprises:

the network device obtains the device information of the at least one candidate storage device;

the network device sends address information of the at least one candidate storage device in the device information to the terminal device, wherein the address information comprises an identifier of the at least one candidate storage device, or the address information comprises an identifier of the at least one candidate storage device and an identifier of a directory in the at least one candidate storage device;

in response to an operation of a user, the terminal device selects one piece of address information from the address information of the at least one candidate storage device as destination address information, and sends an identifier of the terminal device and the destination address information to the network device; and the network device creates the backup task based on the identifier of the terminal device and the destination address information.

18. The system according to claim 14, wherein that the terminal device sends the target data to the network device in response to an indication of the network device comprises:

the terminal device sends login information and destination address information to the network device in response to the indication of the network device, wherein the login information is used to log in to the destination storage device;

the network device finds the destination storage device based on the destination address information, and the network device sends the login information to the destination storage device for verification of the login information;

after the verification succeeds, the network device returns, to the terminal device, a response indicating that verification succeeds; and the terminal device sends the target data to the network device based on the response indicating that verification succeeds.

* * * * *